US006809744B2

(12) United States Patent
Ebersole et al.

(10) Patent No.: US 6,809,744 B2
(45) Date of Patent: *Oct. 26, 2004

(54) METHOD FOR SIMULATING FLOW OF AN EXTINGUISHING AGENT

(75) Inventors: John Franklin Ebersole, Bedford, NH (US); Todd Joseph Furlong, Manchester, NH (US); John Franklin Ebersole, Jr., Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 121 days.

This patent is subject to a terminal disclaimer.

(21) Appl. No.: 10/213,341

(22) Filed: Aug. 6, 2002

(65) Prior Publication Data

US 2003/0003430 A1 Jan. 2, 2003

Related U.S. Application Data

(62) Division of application No. 09/525,983, filed on Mar. 15, 2000, now Pat. No. 6,500,008
(60) Provisional application No. 60/124,428, filed on Mar. 15, 1999, provisional application No. 60/142,120, filed on Jul. 2, 1999, provisional application No. 60/145,401, filed on Jul. 23, 1999, and provisional application No. 60/147,725, filed on Aug. 6, 1999.

(51) Int. Cl.$^7$ .............................................. G09G 5/00
(52) U.S. Cl. ....................................................... 345/633
(58) Field of Search ................................. 345/581–589, 345/592, 606–610, 630, 633, 649, 652, 653, 664, 952, 953, 958, 959, 441, FOR 209–214, 218; 169/5–11, 15, 16, 24, 26, 30, 43, 46, 47, 49, 52, 54; 239/60; 252/2, 3, 6.5, 8.05, 601; 446/432; D21/401, 555; 434/226, 207 R

(56) References Cited

U.S. PATENT DOCUMENTS

| 3,675,343 A | * | 7/1972 | Swiatosz et al. ............ 434/226 |
| 4,001,949 A | * | 1/1977 | Francis ....................... 434/226 |
| 6,500,008 B1 | * | 12/2002 | Ebersole et al. ............ 434/226 |

* cited by examiner

Primary Examiner—Matthew C. Bella
Assistant Examiner—G. F. Cunningham
(74) Attorney, Agent, or Firm—Brian M. Dingman, Esq.; Mirick, O'Connell, DeMallie & Lougee, LLP

(57) ABSTRACT

Method and apparatus are presented for an augmented reality-based firefighter training system. The system includes hardware for motion tracking, display, and vari-nozzle instrumentation. System software includes a real-time fire model, a layered smoke obscuration model, simulation of an extinguishing agent, and an interface to a zone fire model. Physical modeling and graphical elements in the software combine to create realistic-looking fire, smoke, and extinguishing graphics. The hardware and software components together contribute to a realistic, interactive training experience for firefighters.

13 Claims, 5 Drawing Sheets

METHOD FOR SIMULATING FLOW OF AN EXTINGUISHING AGENT

This application is a divisional of pending Nonprovisional patent application Ser. No. 09/525,983 filed on Mar. 15, 2000, now U.S. Pat. No. 6,500,008.

CROSS REFERENCE TO RELATED APPLICATIONS

This application claims priority of pending Provisional patent applications 60/124,428, filed on Mar. 15, 1999, 60/142,120, filed on Jul. 2, 1999, 60/145,401, filed on Jul. 23, 1999, and 60/147,725, filed on Aug. 6, 1999.

GOVERNMENT RIGHTS CLAUSE

This invention was made with Government support under Contract Number N-61339-98-C-0036 awarded by the Naval Air Warfare Center Training Systems Division of Orlando, Fla. The Government has certain rights in the invention.

FIELD OF THE INVENTION

This invention relates to training firefighters in an augmented reality (AR) simulation that includes creation of graphics depicting fire, smoke, and application of an extinguishing agent; and displaying the simulated phenomena anchored to real-world locations seen through a head-worn display.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Current fire simulation for firefighter training is accomplished at facilities that use propane burners and extinguishing agent collectors to simulate the behavior of various types of fires. This approach presents numerous disadvantages, such as safety risks attributable to unintended reflash and explosion; environmental damage attributable to combustion byproducts; health risks to crews due to inhalable combustion byproducts; high operation costs attributable to fuel requirements; high maintenance costs to ensure system integrity and safety; and unrealistic fire simulations for some types of fires (all simulations appear as propane fires as opposed to oil, electrical or paper; and simulated smoke is white instead of black).

A need exists for a new generation of fire fighting/damage control simulation system which does not use live fires. These systems must be capable of providing a high fidelity representation of the smoke and flames, as well as a realistic representation of the environment (to include fellow crew members). Augmented reality (AR) technology allows overlay of computer-generated graphics on a person's view of the real world. With AR, computer generated fire, smoke, and extinguishing agents can safely replace live fire training while still allowing trainees to view and interact with each other and the real-world environment. This allows safe, cost-effective training with greater realism than pure virtual reality (VR) simulations.

The majority of current generation of fire fighting training systems use live, propane-based fires which are unsafe, particularly for use in contained areas such as onboard ships, and in real structures. In a training environment, the use of live propane-based fires presents safety, health and environmental risks.

The primary objective of this invention is the development of an augmented reality-based training (ARBT) system for fire fighting, with application to rescue and hazardous material mitigation. In fact, in any fire situation there are multiple goals, including:

Search, rescue, and extrication

Ingress into, and egress from, a structure

Fire suppression

Structure stabilization

Team coordination—command & control

Fire cause determination

In each of the goals, firefighters engage in a number of cognitive and physical tasks critical to the survival of both fire victims and firefighters, as well as to the timely suppression of a fire. Tasks that fall under this category are (1) Navigation (2) Situation awareness (3) Decision making/problem solving (4) Stress management These tasks are undertaken, usually in concert with one another, to achieve the above goals. Training in these four tasks provides the foundation for a firefighter to combat any fire situation. An opportunity exists to develop an ARBT system which educates firefighters in these tasks in a safe and potentially less expensive environment, in almost any location.

It is important at this juncture to distinguish between the concept of reaction versus interaction with fire and smoke. By reaction we connote responses made by a firefighter to conditions caused by fire and smoke; in this situation he/she does not alter the evolution of the fire and smoke. By interaction we mean that the firefighter directly affects the evolution of the fire and smoke by such actions as fire suppression and ventilation. As stated above, Tasks (1) to (4) are applicable to any fire situation—reactive or interactive. Therefore, any significant improvement in developing training skills for Tasks (1) to (4) will result in a significantly skilled firefighter for both reactive and interactive scenarios.

SUMMARY OF THE INVENTION

An objective of this invention is to demonstrate the feasibility of augmented reality as the basis for an untethered, ARBT system to train firefighters. Two enabling technologies will be exploited: a flexible, wearable belt PC and an augmented reality head-mounted display (HMD).

Unlike traditional augmented reality systems in which an individual is tied to a large workstation by cables from head mounted displays and position trackers, the computer technology is worn by an individual, resulting in an untethered, augmented reality system.

Augmented reality is a hybrid of a virtual world and the physical world in which virtual stimuli (e.g. visual, acoustic, thermal, olfactory) are dynamically superimposed on sensory stimuli from the physical world.

This invention demonstrates a foundation for developing a prototype untethered ARBT system which will support the critical fire fighting tasks of (1) navigation, (2) situation awareness, (3) stress management, and (4) problem solving. The system and method of this invention can be not only a low-cost training tool for fire academies and community fire departments, but also provides a test bed for evaluating future fire fighting technologies, such as decision aids, heads-up displays, and global positioning systems for the 21st century firefighter.

Accordingly, the primary opportunity for an ARBT system is the training of firefighters in the areas of Tasks (1) to (4) above for reactive scenarios.

Significance of the Opportunity

Overall Payoffs. The inventive ARBT system has the significant potential to produce Increased safety Increased task performance Decreased workload Reduced operating costs A training program that aims to increase skills in the Tasks (1) to (4) is adaptable to essentially any fire department, large or small, whether on land, air, or sea.

Opportunities for Augmented Reality for Training. Augmented reality has emerged as a training tool. Augmented reality can be a medium for successful delivery of training. The cost of an effective training program built around augmented reality-based systems arises primarily from considerations of the computational complexity and the number of senses required by the training exercises. Because of the value of training firefighters in Tasks (1) to (4) for any fire situation, and because the program emphasizes firefighter reactions to (vs. interactions with) fire and smoke, training scenarios can be precomputed.

As described elsewhere in this document, models exist which can predict the evolution of fire and smoke suitable for training applications. An opportunity exists to exercise these models off line to compute reactive fire fighting scenarios. These precomputations can lay out various fire- and-smoke induced phenomena which evolve dynamically in time and space and can produce multi-sensor stimuli to the firefighter in 3D space. (For example, if the firefighter stands up, he/she may find his/her visibility reduced due to smoke, whereas if he/she crawls, he/she can see more clearly.)

It has been demonstrated that PC technology is capable of generating virtual world stimuli—in real time. We can then apply our augmented reality capabilities to the development of an augmented reality-based training system.

In summary, the opportunity identified above—which has focused on reactions of firefighters to fire and smoke in training scenarios—is amenable to augmented reality.

Opportunities for Augmented Reality for Training. In augmented reality, sensory stimuli from portions of a virtual world are superimposed on sensory stimuli from the real world. If we consider a continuous scale going from the physical world to completely virtual worlds, then hybrid situations are termed augmented reality.

The position on a reality scale is determined by the ratio of virtual world sensory information to real world information. This invention creates a firefighter training solution that builds on the concept of an augmented physical world, known as augmented reality. Ideally, all training should take place in the real world. However, due to such factors as cost, safety, and environment, we have moved some or all of the hazards of the real world to the virtual world while maintaining the critical training parameters of the real world, e.g., we are superimposing virtual fire and smoke onto the real world.

For a fire example, consider the following. Suppose an office room fire were to be addressed using augmented reality. In this problem, a real room with real furniture is visible in real time through a head mounted display (HMD) with position tracker. Virtual fire and smoke due to virtual combustion of office furniture can be superimposed on the HMD view of the physical office without ever having to actually ignite a piece of real furniture.

The inventive approach allows the firefighter to both react and interact with the real world components and the virtual components of the augmented reality. Examples of potential real-world experiences to be offered by our approach are given below in Table 1—1.

Clearly, simulation of training problems for firefighters can comprise both physical and virtual elements. In many instances augmented reality may be a superior approach when compared to completely virtual reality. For example, exercise simulators such as stationary bicycles, treadmills or stair climbing machines do not adequately capture either the physical perception or the distribution of workload on the musculoskeletal systems that would be produced by actually walking or crawling in the physical world. Additionally, a firefighter can see his/her fellow firefighters, not just a computer representation as in pure virtual reality.

Opportunities for Self-Contained Augmented Reality. A low-cost, flexible, wearable belt PC technology may be used in augmented reality firefighter training. This technology, combined with augmented reality and precomputed fire scenarios to handle tasks (1) to (4) above for various physical locations, allows a firefighter to move untethered anywhere, anytime, inexpensively and safely. This will significantly add more realistic training experiences.

Background Review of Fire Simulation. Mitler (1991) divides fire models into two basic categories: deterministic and stochastic models. Deterministic models are further divided into zone models, field models, hybrid zone/field models, and network models. For purposes of practicality and space limitations, we limit the following discussions to deterministic models, specifically zone type fire models. Mitler goes on to prescribe that any good fire model must describe convective heat and mass transfer, radiative heat transfer, ignition, pyrolysis and the formation of soot. For our purposes, models of flame structure are also of importance.

Zone models are based on finite element analysis (FEA). In a zone model of a fire, a region is divided into a few control volumes—zones. The conditions within each volume are usually assumed to be approximately constant. In the study of compartment fires, two or more zones typically are used: an upper layer, a lower layer, and, optionally, the fire plume, the ceiling, and, if present, a vent. Zone models take the form of an initial value problem for a system of differential and algebraic equations. Limitations of zone models include ambiguity in the number and location of zones, doubt on the validity of empirical expressions used to describe processes within and between zones, and inapplicability of zones to structures with large area or complex internal configurations.

For many training applications, such effects are not significant for purposes of this invention. Friedman (1992) performed a survey of fire and smoke models. Of 31 models of compartment fire, Friedman found 21 zone models and 10 field models. Most of the zone models can run on a PC, while most of the field models require more powerful computational resources.

Background Review of Virtual Reality-Based Training— and Potential for Augmented Reality-Based Training. Probably the core issue surrounding the development of any training system or program is the efficiency of the transfer of knowledge and skills back into the workplace. Individual development ultimately rests on the ability to adapt acquired skills to novel situations. This is referred to, by some, as a metaskill. The transference of skills and the building of metaskills are fundamental concepts against which virtual reality must be considered for its suitability as a basis for the delivery of training.

Experiential learning is based on the premise that people best learn new skills by successfully performing tasks requiring those skills. The application of virtual reality to the delivery of training builds on the promise of experiential learning to maximize the transfer of training into the task environment. Furthermore, virtual reality interfaces also hold the potential for being more motivating than traditional training delivery media by making the training experience itself more fun and interesting. Augmented reality retains these strengths while providing a real world experience for the firefighter.

When concerned with the transfer of skills from a virtual world to the real world, the issue of virtual world fidelity is often raised. Alessi (1988) examined the issue of simulator fidelity in both initial learning and transfer of learning and found that the impact of simulator fidelity increases with the level of expertise of the student. He goes on to recommend that fidelity increase along lines of instruction phases: presentation, guidance, practice, and assessment. Alessi's results are corroborated by Lintern et al. (1990) in their work on the transfer of training using flight simulators for initial training of landing skills. Most notably the authors found that feedback, related to correct performance of the landing task, resulted in increased transfer of training. They also found that transfer of training did not necessarily increase with increasing simulator fidelity. These results on fidelity are important in that they emphasize that simply creating a task environment in a virtual world without consideration of learning processes may not be sufficient to transfer skills to the physical world.

Review of Augmented Reality Equipment. A description of augmented reality was presented above. Commercial off the shelf technologies exist with which to implement augmented reality applications. This includes helmet-mounted displays (HMDs), position tracking equipment, and live/virtual mixing of imagery.

DETAILED DESCRIPTION OF THE INVENTION

Figure 1:
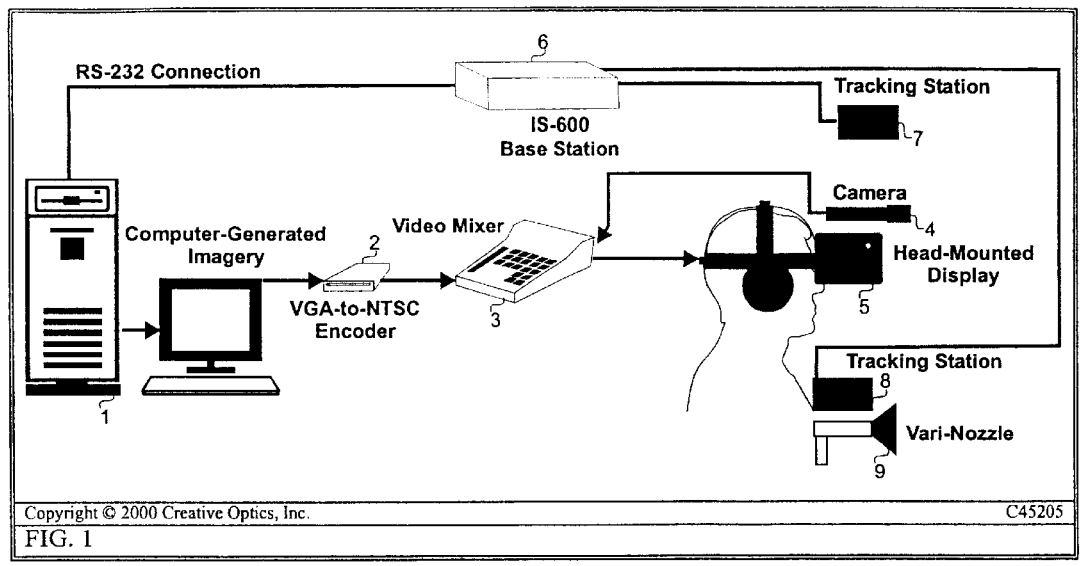
FIG. 1 is a block diagram indicating the hardware components of an embodiment of the augmented reality (AR) firefighter training system, also useful in the method of the invention.

FIG. 1 is a block diagram indicating the hardware components of the augmented reality (AR) firefighter training system, also useful for the method of the invention. Imagery from a head-worn video camera 4 is mixed in video mixer 3 via a linear luminance key with computer-generated (CG) output that has been converted to NTSC using VGA-to-NTSC encoder 2. The luminance key removes white portions of the computer-generated imagery and replaces them with the camera imagery. Black computer graphics remain in the final image, and luminance values for the computer graphics in between white and black are blended appropriately with the camera imagery. The final image is displayed to a user in head-mounted display (HMD) 5.

One alternative to the display setup diagrammed in FIG. 1 is the use of optical see-through AR. In such an embodiment, camera 4 and video mixer 3 are absent, and HMD 5 is one that allows its wearer to see computer graphics overlaid on his/her direct view of the real world. This embodiment is not currently preferred for fire fighting because current see-through technology does not allow black smoke to obscure a viewer's vision.

A second alternative to the display setup diagrammed in FIG. 1 is capturing and overlaying the camera video signal in the computer, which removes the video mixer 3 from the system diagram. This allows high-quality imagery to be produced because the alpha, or transparency channel of the computer 1 graphics system may be used to specify the amount of blending between camera and CG imagery. This embodiment is not currently preferred because the type of image blending described here requires additional delay of the video signal over the embodiment of FIG. 1, which is undesirable in a fire fighting application because it reduces the level of responsiveness and interactivity of the system.

A third alternative to the display setup diagrammed in FIG. 1 is producing two CG images and using one as an external key for luminance keying in a video mixer. In this embodiment, two VGA-to-NTSC encoders 2 are used to create two separate video signals from two separate windows created on the computer 1. One window is an RGB image of the scene, and a second window is a grayscale image representing the alpha channel. The RGB image may be keyed with the camera image using the grayscale alpha signal as the keying image. Such an embodiment allows controllable transparency with a minimum of real-world video delay.

FIG. 1 diagrams the two 6 degree-of-freedom (6DOF) tracking stations 7 and 8 present in all embodiments of the system. One tracking station 7 is attached to the HMD 5 and is used to measure a user's eye location and orientation in order to align the CG scene with the real world. In addition to matching the real-world and CG eye locations, the fields of view must be matched for proper registration. The second tracking station 8 measures the location and orientation of a nozzle 9 that may be used to apply virtual extinguishing agents. Prediction of the 6DOF locations of 7 and 8 is done to account for system delays and allow correct alignment of real and virtual imagery. The amount of prediction is varied to allow for a varying CG frame rate. The system uses an InterSense IS-600 tracking system 6, and it also supports the InterSense IS-900 and Ascension Flock of Birds.

Additional hardware is attached to vari-nozzle 9 to allow control of a virtual water stream. A potentiometer attached to the bail handle measures the handle angle to determine whether or not the nozzle is on or off. A second potentiometer attached to the pattern selector measures the nozzle spray angle. An analog-to-digital (A/D) converter reads voltages from the potentiometers and converts them into appropriate units for nozzle control.

Figure 2:
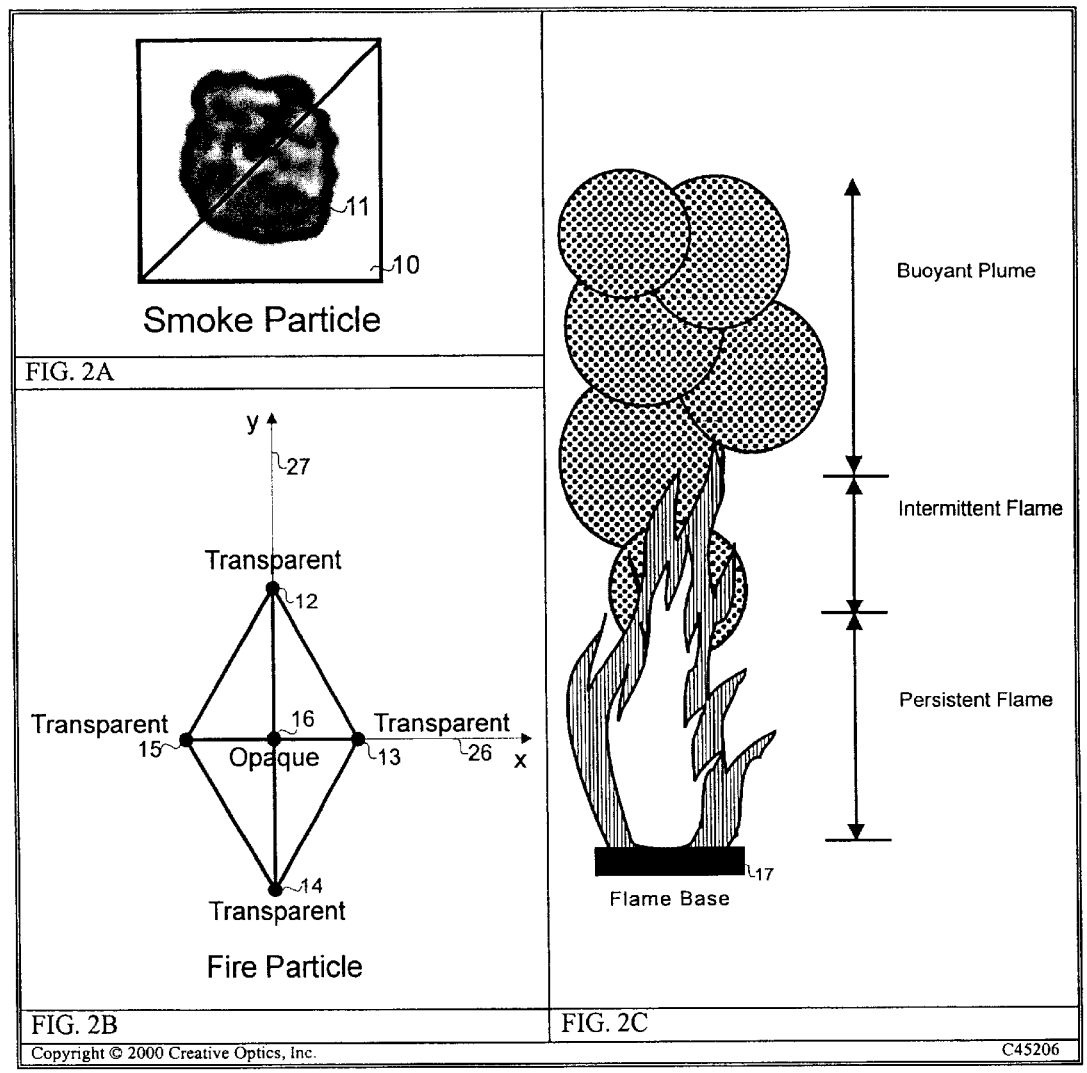
FIG. 2A illustrates the geometric particle representation associated with smoke.
FIG. 2B illustrates the geometric particle representation associated with flames.
FIG. 2C illustrates the three particle systems used to represent a fire.

A method for real-time depiction of fire is diagrammed in FIGS. 2A–C. A particle system is employed for each of the persistent flame, intermittent flame, and buoyant plume components of a fire, as diagrammed in FIG. 2C. The particles representing persistent and intermittent flames are created graphically as depicted in FIG. 2B. Four triangles make up a fire particle, with transparent vertices 12–15 at the edges and an opaque vertex 16 in the center. Smooth shading of the triangles interpolates vertex colors over the triangle surfaces. The local Y axis 27 of a fire particle is aligned to the direction of particle velocity, and the particle is rotated about the local Y axis 27 to face the viewer, a technique known as "billboarding." A fire texture map is projected through both the persistent and intermittent flame particle systems and rotated about a vertical axis to give a horizontal swirling effect.

Smoke particles, used to represent the buoyant plume portion of a flame, are created graphically as depicted in FIG. 2A. A texture map 11 representing a puff of smoke is applied to each particle 10, which consists of two triangles, and transparency of the texture-mapped particle masks the appearance of polygon edges. Smoke particles 10 are rotated about two axes to face the viewer, a technique known as "spherical billboarding."

The flame base 17 is used as the particle emitter for the three particle systems, and buoyancy and drag forces are applied to each system to achieve acceleration in the persistent flame, near-constant velocity in the intermittent flame, and deceleration in the buoyant plume. An external force representing wind or vent flow may also be applied to affect the behavior of the fire plume particles. When flame particles are born, they are given a velocity directed towards the center of the fire and a life span inversely proportional to their initial distance from the flame center. The emission rate of intermittent flame particles fluctuates sinusoidally at a rate determined by a correlation with the flame base area. Flame height may be controlled by appropriately specifying the life span of particles in the center portion of the flame.

A number of graphical features contribute to the realistic appearance of the fire and smoke plume diagrammed in FIG. 2C. Depth buffer writing is disabled when drawing the particles to allow blending without the need to order the drawing of the particles from back to front. A light source is placed in the center of the flames, and its brightness fluctuates in unison with the emission rate of the intermittent flame particle system. The light color is based on the average color of the pixels in the fire texture map applied to the flame particles. Lighting is disabled when drawing the flame particles to allow them to be at full brightness, and lighting is enabled when drawing the smoke particles to allow the light source at the center of the flame to cast light on the smoke plume. A billboarded, texture-mapped, polygon with a texture that is a round shape fading from bright white in the center to transparent at the edges is placed in the center of the flame to simulate a glow. The RGB color of the polygon is the same as the light source, and the alpha of the polygon is proportional to the density of smoke in the atmosphere. When smoke is dense, the glow polygon masks the individual particles, making the flames appear as a flickering glow through smoke. The glow width and height is scaled accordingly with the flame dimensions.

Figure 3:
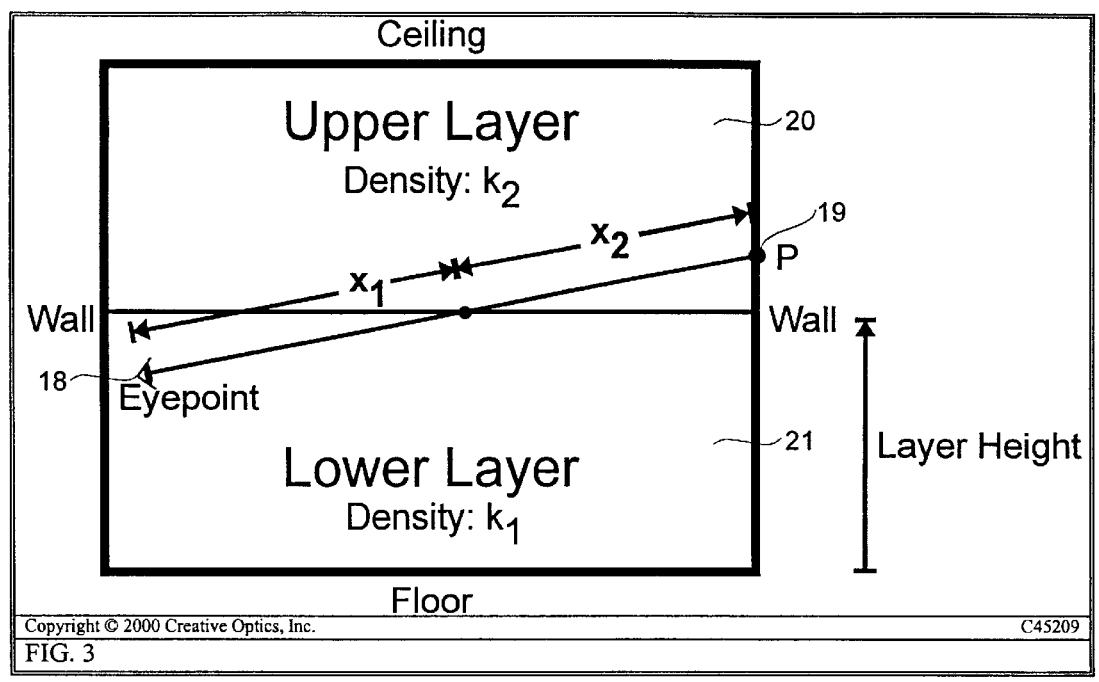
FIG. 3 illustrates the idea of two-layer smoke obscuration.

FIG. 3 describes the concept of two layers of smoke in a compartment. In a compartment fire, smoke from the buoyant plume rises to the top of a room and spreads out into a layer, creating an upper layer 20 and a lower layer 21 with unique optical densities. The lower layer has optical density $k_1$, and the upper layer has density $k_2$. Transmittance through the layers from a point P 19 on the wall to a viewer's eye 18 is given by the equation $T=e^{-(k_1 x_1 + k_2 x_2)}$. The color of 19 as seen through smoke is given by $C=TC_i+(1-T)C_s$, where $C_i$ represents the color of 19 with no obscuration and $C_s$ represents the smoke color.

To apply the concept of two-layer smoke in an AR system, a polygonal model of the real room and contents is created. The model is aligned to the corresponding real-world using the system of FIG. 1. As the model is drawn, the above equations are applied to modify the vertex colors to reflect smoke obscuration. Smooth shading interpolates between vertex colors so that per-pixel smoke calculations are not required. If the initial color, $C_i$, of the vertices is white, and the smoke color, $C_s$, is black, the correct amount of obscuration of the real world will be achieved using the luminance keying method described above. In the other video-based embodiments, the above equations can be applied to the alpha value of vertices of the room model.

In computer graphics, color values are generally specified using and integer range of 0 to 255 or a floating point range of 0 to 1.0. Using the obscuration approach described above of white objects that become obscured by black smoke, this color specification does not take into account light sources such as windows to the outdoors, overhead fluorescent lights, or flames; which will shine through smoke more than non-luminous objects such as walls and furniture. To account for this, a luminance component was added to the color specification to affect how objects are seen through smoke. Luminance values, L, range from 0 to 1.0 in this embodiment, and they alter the effective optical density as follows: $k'=k(1-L)$. This makes objects with higher luminance show through smoke more than non-luminous (L=0) objects.

One additional component to the layered smoke model is the addition of a smoke particle system, as depicted in FIG. 2A. A smoke particle system is placed in the upper, denser layer 20 to give movement to the otherwise static obscuration model. To determine the volume and optical density of the upper smoke layer, one method is to assign volume and density characteristics to the buoyant plume smoke particles. When a buoyant plume smoke particle fades after hitting the ceiling of a room, the volume and optical density of the particle can be added to the upper layer to change the height and optical density the layer.

The same polygonal model used for smoke obscuration is also used to allow real-world elements to occlude the view of virtual objects such as smoke and fire. A fire plume behind a real desk that has been modeled is occluded by the polygonal model. In the combined AR view, it appears as if the real desk is occluding the view of the fire plume.

Graphical elements such as flame height, smoke layer height, upper layer optical density, and lower layer optical density may be given a basis in physics by allowing them to be controlled by a zone fire model. A file reader developed for the system allows CFAST models to control the simulation. CFAST, or consolidated fire and smoke transport, is a zone model developed by the National Institute of Standards and Technology (NIST) and used worldwide for compartment fire modeling. Upper layer temperature calculated by CFAST is monitored by the simulation to predict the occurrence of flashover, or full room involvement in a fire. The word "flashover" is displayed to a trainee and the screen is turned red to indicate that this dangerous event in the development of a fire has occurred.

Figure 4:
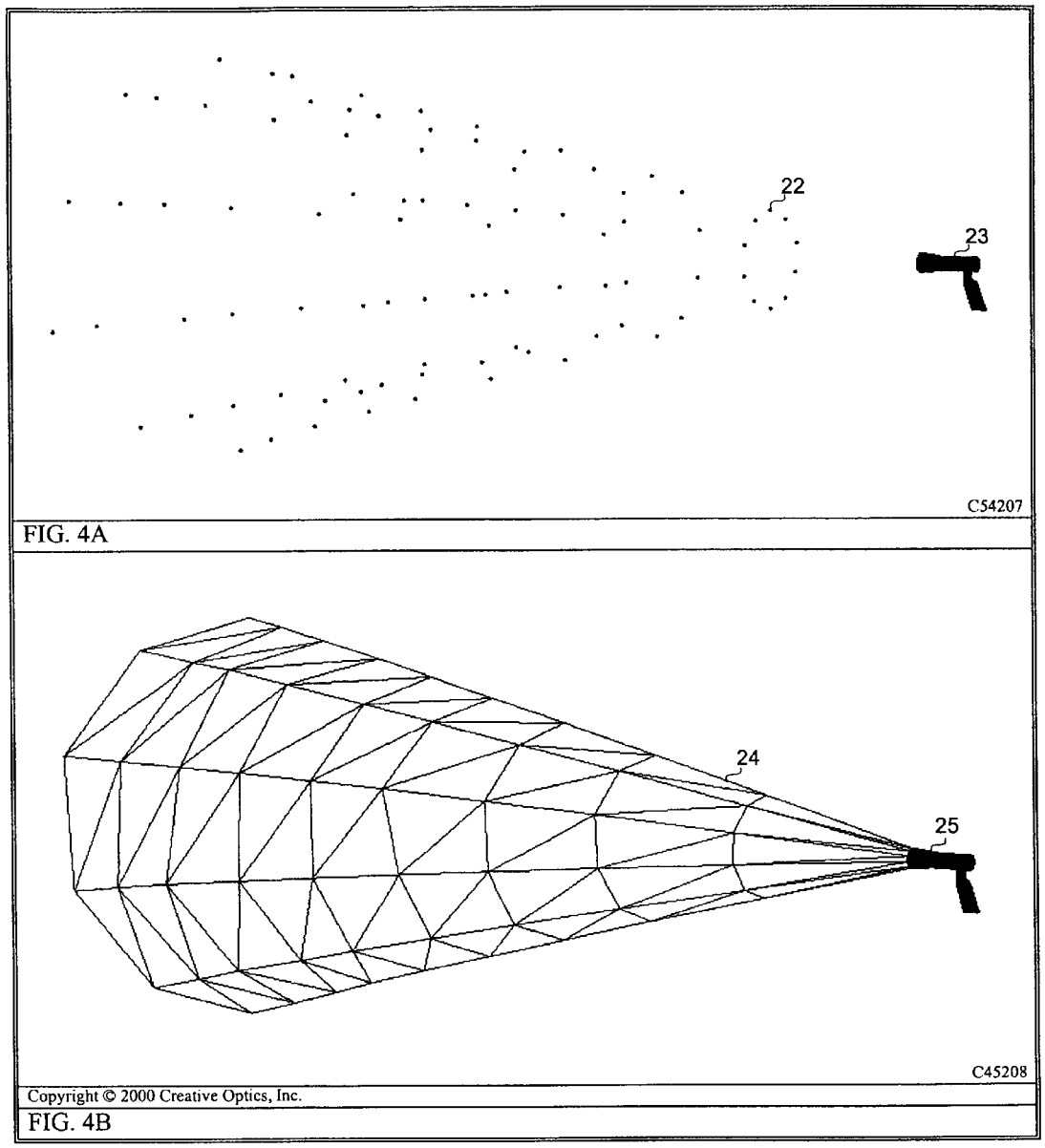
FIG. 4A illustrates particle arrangement for a surface representation of a particle system.
FIG. 4B illustrates a surface mesh for a surface representation of a particle system.

A key component in a fire fighting simulation is simulated behavior and appearance of an extinguishing agent. In this embodiment, water application from a vari-nozzle 9, 23, and 25 has been simulated using a particle system. To convincingly represent a water stream with minimal computation, a surface representation of a particle system was devised. This representation allows very few particles to represent a water stream, as opposed to alternative methods that would require the entire volume of water to be filled with particles. Behavior such as initial water particle velocity and hose stream range for different nozzle settings is assigned to a water particle system. Water particles are then constrained to emit in a ring pattern from the nozzle location each time the system is updated. This creates a series of rings of particles 22 as seen FIG. 4A. The regular emission pattern and spacing of particles allows a polygon surface to easily be created using the particles as triangle vertices, as seen in the wireframe mesh 24 in FIG. 4B. The surface 24 is texture-mapped with a water texture, and the texture map is translated in the direction of flow at the speed of the flow. A second surface particle system that is wider than the first is given a more transparent texture map to the hard edge of the surface particle system representation. A third particle system using small billboards to represent water droplets is employed to simulate water splashing.

To add realism to the behavior of the water stream, collision detection with the polygonal room and contents model is employed. A ray is created from a particle's current position and its previous position, and the ray is tested for intersection with room polygons to detect collisions. When a collision between a water particle and room polygon is detected, the particle's velocity component normal to the surface is reversed and scaled according to an elasticity coefficient. The same collision method is applied to smoke particles when they collide with the ceiling of a room. Detection of collision may be accomplished in a number of ways. The "brute force" approach involves testing every particle against every polygon. For faster collision detection, a space partitioning scheme may be applied to the room polygons in a preprocessing stage to divide the room into smaller units. Particles within a given space are only tested for collision with polygons that are determined to be in that space in the preprocessing stage. Some space partitioning schemes include creation of a uniform 3-D grid, binary space partitioning (BSP), and octree space partitioning (OSP).

A simpler approach to collisions that is applicable in an empty rectangular room is the use of an axis-aligned bounding box. In such an implementation, particles are simply given minimum and maximum X, Y, and Z coordinates, and a collision is registered if the particle position meets or exceeds the specified boundaries.

To increase the realism of water application, steam is generated when water particles collide at or near the location of the fire. Steam particle emitters are placed at the collision locations and they are given an emittance rate that is scaled by the size of the fire and the inverse of the collision's distance from the fire. Steam particles are rendered as spherically billboarded, texture-mapped polygons similar to the smoke particles in FIG. 2A, but with a different texture map 11 and different particle behavior. In compartment fire fighting, steam is generated when a hose stream is aimed at the upper, hot gas layer. Steam particle systems may be placed in this layer to simulate this phenomenon. Steam emittance in the upper layer can be directly proportional to the temperature of the upper layer as calculated by CFAST.

To simulate extinguishment, a number of techniques are employed. Water particles that collide with the surface on which the flame base is located are stored as particles that can potentially contribute to extinguishment. The average age of these particles is used in conjunction with the nozzle angle to determine the average water density for the extinguishing particles. Triangles are created using the particle locations as vertices. If a triangle is determined to be on top of the fire, then an extinguishment algorithm is applied to the fire.

Extinguishing a fire primarily involves reducing and increasing the flame height in a realistic manner. This is accomplished by managing three counters that are given initial values representing extinguish time, soak time, and reflash time. If intersection between water stream and flame base is detected, the extinguish time counter is decremented, and the flame height is proportionately decreased until both reach zero. If water is removed before the counter reaches zero, the counter is incremented until it reaches its initial value, which increments the flame height back to its original value. After flame height reaches zero, continued application of water decrements the soak counter until it reaches zero. If water is removed before the soak counter reaches zero, the reflash counter decrements to zero and the flames re-ignite and grow to their original height. The rate at which the extinguish and soak counters are decremented can be scaled by the average water density for more realistic behavior.

To allow more realistic extinguishing behavior, a flame base is divided into a 2-D grid of smaller areas. Each grid square is an emitter for three particle systems: persistent flames, intermittent flames, and buoyant plume. When flame particles are born in a grid square, they are given a velocity directed towards the center of the flame base and a life span inversely proportional to their initial distance from the flame center. This allows multiple flame particle systems to appear as a single fire. Each grid square has an independent flame height, extinguish counter, soak counter, and reflash counter. This allows portions of a flame to be extinguished while other portions continue to burn. This is especially useful for larger fires where the hose stream can only be directed at one part of the fire at a time.

3-D audio allows sound volume to diminish with distance from a sound emitter, and it allow works with stereo headphones to give directionality to sounds. 3-D audio emitters are attached to the fire and the hose nozzle. The fire sound volume is proportional to physical volume of the fire.

Appendix A contains settings for the parameters of particle systems used in the invention. These parameters are meant to be guidelines that give realistic behavior for the particles. Many of the parameters are changed within the program, but the preferred starting parameters for flames, smoke, steam, and water are listed in the appendix.

Approach to Untethered ARBT for Firefighters. The basic philosophy behind the objectives herein for developing an untethered ARBT system for firefighters follows from a systems-based approach to training system development. The essential steps in such an approach are:

Determine training goals and functions

Implement a development strategy

Perform training needs analysis

Assess training needs

Collect and analyze task data

Undertake training system development

Write training objectives

Construct criterion measures

Construct evaluative measures

Choose a delivery system

Select and sequence content

Select an instructional strategy

Develop augmented reality firefighter training system software and hardware

Develop/implement an accurate position tracking system

Develop/implement capability for mixing real and virtual imagery

Develop/implement capability for anchoring virtual objects in the real world

Figure 5:
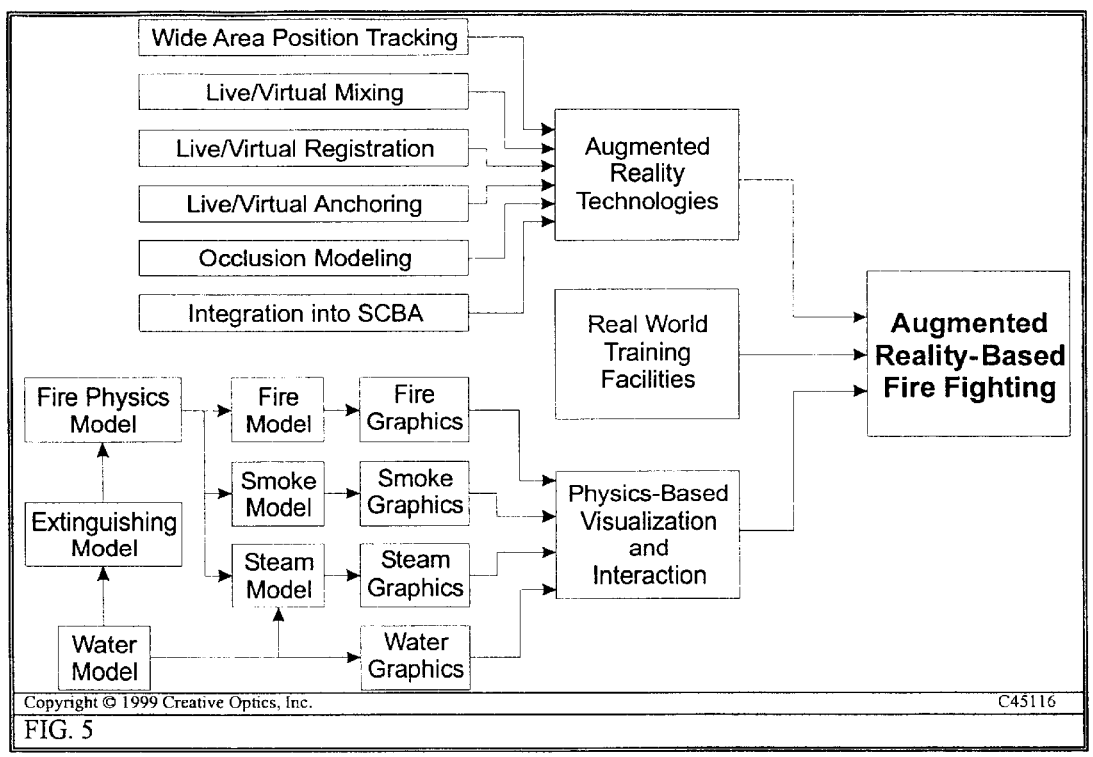
FIG. 5 illustrates the technologies that combine to create an AR firefighter training system, and method.

Develop/implement models for occluding real objects by virtual objects and virtual objects by real objects Develop/implement technology to display augmented reality scenes to the firefighter Develop/implement models for fire, smoke, water, and steam Perform system integration of the above (See FIG. 5)

Establish training system validity

Test & evaluate

The opportunity identified above amounts to an assessment of training needs of firefighters tempered by the realities of state-of-the-art technologies.

The issues in this needs assessment include:

Sensory representations of fire and smoke

Real-time presentation of those sensory representations

Modeling of fire spread

Instructor authoring of fire training exercises

We consider pre-flashover compartment fires in an effort to demonstrate feasibility of our approach to a training system. Flashover refers to the point in the evolution of a compartment fire in which the fire transitions from local burning to involvement of the entire compartment.

One of the key elements of our approach is the precomputation of fire dynamics. We have elected to use a zone-type fire model. A zone-type fire model should provide sufficient accuracy for meeting our training objectives. There are a number of zone models available, including the Consolidated Fire and Smoke Transport Model (CFAST) from NIST and the WPI fire model from Worcester Polytechnic Institute, among others.

The outputs of a zone-type fire model can be extended to achieve a visual representation of a compartment fire.

TABLE 1-1

Examples of Real World Actions and Augmented World Effects in a Fire Fighting Training Scenario. The Self-Contained Augmented Reality training system of this invention will provide real-world experiences like these.

| REALITY | AUGMENTED REALITY |
|---|---|
| Feel real walls | See virtual fire near the real ceiling |
| Turn real doorknobs | Hear virtual roaring fire on other side of door |
| | Experience virtual smoke pour out |
| Crawl | Keep below virtual smoke layer of 2 feet above floor |
| Climb real stairs | See the loss of visibility at top of virtual smoke-filled stairway |
| | Maybe smell virtual smoke if your SCBA is ill-fitted |
| View a real aircraft on real tarmac of runway | See virtual smoke and fire and locate real rescue points |
| Enter real aircraft, physically perform a right-hand search pattern | Navigate among virtual smoke and fire filled fuselage |
| | Attempt search and rescue while virtual fire advances on your position |
| | Make error in right-hand search and become disoriented |

TABLE 1-1-continued

Examples of Real World Actions and Augmented World Effects in a Fire Fighting Training Scenario. The Self-Contained Augmented Reality training system of this invention will provide real-world experiences like these.

| REALITY | AUGMENTED REALITY |
|---|---|
| | Experience claustrophobia as time on your SCBA runs out and visibility decreases |
| | Experience stress when your SCBA "malfunctions" (via instructor radio remote control) |

Task 1. Infrastructure for Real-Time Display of Fire

Task Summary. The organization and structuring of information to be displayed is as important as actual display processing for real-time dynamical presentation of augmented environments. As a firefighter moves through a scenario (using an augmented reality device) the location, extent, and density of fire and smoke change. From a computational perspective, an approach is to examine the transfer of data to and from the hard disk, through system memory, to update display memory with the desired frequency.

Approach to This Task. Precomputation of the bulk of a firefighter training simulation, implies that most of the operations involved in real-time presentation of sensory information revolve around data transfer. In order to identify bottlenecks and optimize information throughput, it is advantageous to analyze resource allocation in the context of some systems model, such as queuing theory. Given such an analysis, we may then implement data structures and the memory management processes that form what we call the infrastructure for real-time presentation of sensory information.

Risks and Risk Management. The risks inherent in this task arise from unrecognized or unresolved bottlenecks remaining in our infrastructure for real-time presentation of sensory information. This risk is managed in our approach by thorough analysis of resource allocation requirements prior to commitment in software of any particular data management configuration. Furthermore, subsequent tasks build on this infrastructure and therefore continue the process of challenging and reinforcing our approach to an infrastructure for real-time presentation of sensory information.

Measures of Success. Completion of this task can be recognized by the existence of a fully implemented and tested data management system. The level of success achieved for this task can be directly measured in terms of data throughput relative to system requirements.

Task 2. Visual Representation of Smoke and Fire

Task Summary. The way in which sensory stimuli are presented in an ARBT scenario may or may not effect task performance by a student. It is essential to capture the aspects of the sensory representations of fire and smoke that affect student behavior in a training scenario without the computational encumbrance of those aspects that do not affect behavior. For the purposes of providing sensory stimuli for firefighter training, we need to know not only the spatial distribution and time evolution of temperature and hot gases in a compartment fire, but also the visible appearance of smoke and flame, along with sounds associated with a burning compartment, taken over time. There are three tiers of attributes of fire and smoke:

First tier: location and extent

Second tier: opacity, luminosity, and dynamics

Third tier: illumination of other objects in the scene

Approach. Part of the rationale behind the problem identified above is the degree to which the time- and 3D-space-dependent elements of a desired scenario for a compartment fire can be precomputed. The visual representations of fire and smoke can be precomputed. In order to do so, and still retain real-time effects, the appearance of the fire and smoke from reasonable vantage points within the compartment would be determined. As a firefighter moves through a training simulation, the appropriate data need only be retrieved in real time to provide the necessary visual stimulation.

The emission of visual light from flame and the scattering and absorption of light by smoke is to be modeled. A zone-type fire model can be used to determine the location and extent of the smoke and flame. In addition to these quantities, the zone-type fire model also will yield aerosol densities in a given layer. Values for optical transmission through smoke can be calculated using a standard model such as found in the CFAST (Consolidated Fire and Smoke Transport) model, or in the EOSAEL (Electro-Optical Systems Atmospheric Effects Library) code.

It is thought that the intermittent flame region in a fire oscillates with regularity, and that the oscillations arise from instabilities at the boundary between the fire plume and the surrounding air. The instabilities generate vortex structures in the flame which in turn rise through the flame resulting in observed oscillations. For the purposes of this description, the visual dynamics of flame can be modeled from empirical data such as is known in the art.

Measures of Success. This task can be judged on the aesthetics of the visual appearance of the simulated fire and smoke. Ultimately, the visual appearance of fire and smoke should be evaluated relative to the efficacy of an ARBT system.

Task 3. Position Anchoring

Task Summary. Augmented reality techniques rely on superimposing information onto a physical scene. Superposition means that information is tied to objects or events in the scene. As such, it is necessary then to compensate for movement by an observer in order to maintain the geometric relations between superimposed information and underlying physical structures in the scene.

Approach. Position sensors in the form of a head tracker can, in real-time, calculate changes in location caused by movement of a firefighter within a training scenario. Virtual objects will be adjusted accordingly to remain "fixed" to the physical world.

Risks and Risk Management. Rapid movements by an observer can cause superimposed information to lag behind the apparent motion of objects in the field of view. This lag may result in the feeling that the superimposed information is floating independent of the scene rather than remaining anchored to a specific position. In severe cases the lag in motion compensation may result in a form of simulator sickness which arises when conflicting motion information is received by the brain. In order to minimize this effect, we can again consider the complexity of the visual presentation of augmented information. (It may also be possible to essentially blank out the augmented information until observer movement stabilizes.)

Measures of Success. Anchoring virtual flame and smoke to a specified position in a real room with minimal motion lag signals the completion of this task.

Task 4. Authoring Tools

Task Summary. The implementation of any sort of authoring tool for instructors to create training scenarios is beyond the scope of this description. However, because we do envision the creation of a prototype authoring system, this task is devoted to the investigation of issues and characteristics involved. An authoring system typically takes the form of a visual programming interface over a modular toolkit of fundamental processes. A training instructor can use an authoring tool to visually select and sequence modules to create the desired training course without ever having to resort to direct programming in some computer language such as C or FORTRAN.

Approach. Authoring tools do exist for construction of general, business-oriented, computer-based training. Examination of successful attempts can serve as an instructive guide to specification of an authoring system supporting ARBT for firefighters.

Risks and Risk Management. Although there is no risk, per se, inherent in this task, authoring any real-time system is problematic. An authoring system relies on the existence of independent modules that are executed through a central control facility. If the control module handles all data traffic, then bottlenecks may occur that would not necessarily exist in an optimized, real-time system.

Measures of Success. This task leads into development for instructors of an authoring system for an ARBT system for firefighters. The measure of success then lies in the coverage of issues pertaining to authoring of real-time systems commercially available authoring tools or systems

Task 5. ARBT Technology Demonstration

Task Summary. The previous tasks herein developed the pieces of an augmented reality fire simulation. It remains to pull everything together into a coherent demonstration to show the suitability of the selected technologies to the delivery of training to firefighters.

Approach. A scenario consisting of a real room and virtual fire is to be constructed, and a problem solving situation will be presented to prospective trainees.

Risks and Risk Management. The obvious risk is that the virtual fire and smoke training demonstration scenarios do not achieve adequate realism to an experienced firefighter.

Measures of Success. The real measure of success for this task lies in the realism perceived by a trainee. In order to judge the success of the demonstration, the users will evaluate the effectiveness of the simulation.

Appendix A

The descriptions in this Appendix contain parameters that may be used to describe the behavior of particle systems used to represent the following phenomena:

Flames

Smoke plume

Smoke with random motion to be used in the upper layer

Steam

Water spray from a vari-nozzle

Default Fire Parameters

System Type: Faded, Directional Quads
Emitter Shape: Rectangular
Global Force Vector (lbf): 0.0, 1.00, 0.0
Particle Mass: 0.2 lbm
Mass Variance: 0.0
Yaw: 0.0 radian
Yaw Variance: 6.28 radian
Pitch: 0.0 radian
Pitch Variance: 0.05 radian
Initial Speed: 0.65 ft/s
Initial Speed Variance: 0.05 ft/s
Emission Rate: 750 particles/sec
Emission Rate Variance: 500 particles/sec
Life Span: 1.3 sec
Life Span Variance: 0.1 sec
Start Color (RGBA): 1.0, 1.0, 1.0, 0.0
Middle Color (RGBA): 1.0, 1.0, 1.0, 1.0
End Color (RGBA): 1.0, 1.0, 1.0, 0.0
Random Force: 0.45 lbf
Start Scale: 1.0
End Scale: 1.0

Default Smoke Parameters

System Type: Billboard
Emitter Shape: Rectangular
Global Force Vector (lbf): 0.0, 1.00, 0.0
Particle Mass: 0.2 lbm
Mass Variance: 0.05
Yaw: 0.0 radian
Yaw Variance: 6.28 radian
Pitch: 1.2 radian
Pitch Variance: 0.393 radian
Initial Speed: 0.2 ft/s
Initial Speed Variance: 0.0 ft/s
Emission Rate: 10.0 particles/sec
Emission Rate Variance: 0.25 particles/sec
Life Span: 3.25 sec
Life Span Variance: 0.25 sec
Start Color (RGBA): 1.0, 1.0, 1.0, 0.0
Middle Color (RGBA): 1.0, 1.0, 1.0, 0.85
End Color (RGBA): 1.0, 1.0, 1.0, 0.0
Random Force: 0.4 lbf
Start Scale: 0.105
End Scale: 4.2

Default Layer Smoke Parameters

System Type: Billboard
Emitter Shape: Rectangular
Global Force Vector (lbf): 0.0, 0.025, 0.0
Particle Mass: 0.2 lbm
Mass Variance: 0.05
Yaw: 0.0 radian
Yaw Variance: 6.28 radian
Pitch: 1.2 radian
Pitch Variance: 0.393 radian
Initial Speed: 0.0 ft/s
Initial Speed Variance: 0.0 ft/s
Emission Rate: 35.0 particles/sec
Emission Rate Variance: 5.0 particles/sec
Life Span: 4.0 sec
Life Span Variance: 0.5 sec
Start Color (RGBA): 1.0, 1.0, 1.0, 0.0
Middle Color (RGBA): 1.0, 1.0, 1.0, 1.0
End Color (RGBA): 1.0, 1.0, 1.0, 0.0
Random Force: 0.35 lbf
Start Scale: 1.75
End Scale: 3.75

Default Steam Parameters

System Type: Billboard
Emitter Shape: Rectangular
Global Force Vector (lbf): 0.0, 0.4, 0.0
Particle Mass: 0.2 lbm
Mass Variance: 0.05
Yaw: 0.0 radian
Yaw Variance: 6.28 radian
Pitch: 1.2 radian
Pitch Variance: 0.393 radian
Initial Speed: 0.6 ft/s
Initial Speed Variance: 0.0 ft/s
Emission Rate: 50.0 particles/sec
Emission Rate Variance: 10.0 particles/sec
Life Span: 2.5 sec
Life Span Variance: 0.5 sec
Start Color (RGBA): 1.0, 1.0, 1.0, 0.0
Middle Color (RGBA): 1.0, 1.0, 1.0, 0.45
End Color (RGBA): 1.0, 1.0, 1.0, 0.0
Random Force: 0.25 lbf
Start Scale: 0.7
End Scale: 2.8

Default Water Stream Parameters

System Type: Surface
Emitter Shape: Spherical
Global Force Vector (lbf): 0.0, −2.11, 0.0
Particle Mass: 0.0656 lbm
Mass Variance: 0.005
Initial Speed: 162.0 ft/s
Initial Speed Variance: 0.0 ft/s
Life Span: 4.5 sec
Life Span Variance: 0.4 sec
Start Color (RGBA): 0.65, 0.65, 1.0, 1.0
Middle Color (RGBA): 0.65, 0.65, 1.0, 0.5
End Color (RGBA): 0.75, 0.75, 1.0, 0.0
Random Force: 0.15 lbf Although specific features of the invention are shown in some drawings and not others, this is for convenience only, as each feature may be combined with any or all of the other features in accordance with the invention.

Other embodiments will occur to those skilled in the art and are within the following claims.

What is claimed is:

1. A method of simulating flow of an extinguishing agent from a fire hose or other agent application means for graphical display, comprising:
   employing at least one particle system to simulate physical behavior of an extinguishing agent stream;
   organizing particles into regularly spaced rings;
   using particle locations as polygon vertices to create a surface;
   texture mapping said surface; and
   moving said texture map in the direction of extinguishing agent flow to simulate extinguishing agent flow.

2. The method of claim 1 in which there are surfaces in the display, and wherein the intersection of a water stream with a surface generates steam particles.

3. The method of claim 1 in which there is a flame base grid including sub-areas, and in which flames are displayed emanating from the flame base, and in which the intersection of the extinguishing agent stream with the flame base grid sub-area is determined, and used to reduce the height of the flames emanating from that sub-area.

4. The method of claim 1 in which there are polygonal models in the display, and wherein the extinguishing agent particles' collision with a polygonal model are determined, and the direction of movement of the extinguishing agent particles is changed accordingly based on particle elasticity.

5. The method of claim 1 in which two rings of particles are emitted to create an outer and inner surface.

6. The method of claim 5 in which the outer surface is given a different, more transparent texture than the inner surface in order to mask the surface edges.

7. The method of claim 4 in which collision is determined by testing every particle with all polygons that they may collide with.

8. The method of claim 4 in which selected particles are tested for collision with selected polygons in order to improve speed.

9. The method of claim 8 in which space is partitioned into a 3-D grid in order to limit the number of polygons and particle pairings that are tested for collision.

10. The method of claim 8 in which space is partitioned using a binary space partition (BSP) tree approach in order to determine which particles to test for collision with which polygons.

11. The method of claim 8 in which space is partitioned using an octree space partition (OSP) tree approach in order to determine which particles to test for collision with which polygons.

12. The method of claim 4 in which collision is determined by setting axis-aligned minimum and maximum bounds for particle motion.

13. The method of claim 1 further comprising employing another particle system to represent water droplets.

* * * * *